US00RE42075E

(19) United States
(12) Reissued Patent
Chiu

(10) Patent Number: US RE42,075 E
(45) Date of Reissued Patent: Jan. 25, 2011

(54) ELECTRICAL CONNECTOR

(75) Inventor: Allen Chiu, Santa Clara, CA (US)

(73) Assignee: Chimei Innolux Corporation, Miao-Li County (TW)

(21) Appl. No.: 12/799,349

(22) Filed: Apr. 22, 2010

Related U.S. Patent Documents

Reissue of:
(64) Patent No.: 6,022,244
Issued: Feb. 8, 2000
Appl. No.: 09/336,288
Filed: Jun. 18, 1999

(30) Foreign Application Priority Data

Feb. 5, 1999 (TW) ..... 88201927

(51) Int. Cl.
*H01R 13/73* (2006.01)

(52) U.S. Cl. ..... 439/570
(58) Field of Classification Search ..... 439/570–572, 439/567
See application file for complete search history.

(56) References Cited

U.S. PATENT DOCUMENTS 5,096,440 A * 3/1992 Katsumata ..... 439/570
5,194,017 A * 3/1993 Consoli ..... 439/492
5,297,966 A * 3/1994 Brennian, Jr. et al. ..... 439/64
5,385,478 A * 1/1995 Niekawa ..... 439/67
5,704,807 A * 1/1998 Sherman et al. ..... 439/570
5,937,936 A * 8/1999 Chiu et al. ..... 439/570

* cited by examiner

*Primary Examiner*—Gary F. Paumen
(74) *Attorney, Agent, or Firm*—Raymond J. Chew

(57) ABSTRACT

An electrical connector for engaging with a mated connector in a mating direction comprises a dielectric housing receiving a number of contacts therein, and a pair of retention members for securely fixing the connector to a circuit board. The housing forms a pair of latching members outwardly projecting from opposite ends thereof for securely receiving the retention members therein. Each latching member forms a recess and a projection integrally extending into the recess. Each retention member is L-shaped and comprises a latching portion having a width substantially equal to the width of the corresponding recess for being secured received therein, and a mounting portion perpendicular to the latching portion and extending beyond the corresponding latching member for being surface mounted to the circuit board. Since the retention members are securely fixed to the corresponding latching member in a latching direction perpendicular to the mating direction of the connector, the connector will not move in the mating direction when the mating connector is inserted into or withdrawn from the connector.

4 Claims, 7 Drawing Sheets

ELECTRICAL CONNECTOR

Matter enclosed in heavy brackets [ ] appears in the original patent but forms no part of this reissue specification; matter printed in italics indicates the additions made by reissue.

BACKGROUND OF THE INVENTION

The present invention relates to an electrical connector, and particularly to an electrical connector with a retention system which can effectively resist a mating force of the connector to ensure proper electrical connection between contacts of the connector and a circuit board.

An electrical connector is commonly fixed to a circuit board by a retention member for securely fixing the connectors onto the circuit board and for absorbing a portion of mating force exerted on contacts received in the connector when a mating connector is engaged therewith. Referring to FIG. 1, a pair of conventional retention members 100 are fixed to opposite ends of a dielectric housing 200 of a conventional connector. Each retention member 100 comprises a mounting plate 110 defining a mounting hole 120 therein for receiving a screw (not shown) to attach the retention member 100 to the housing 200, and mounting legs 130 for being inserted into corresponding through hole 500 defined in a circuit board 300 thereby fixing the connector to the circuit board 300. However, the through holes 500 of the circuit board 300 compromise circuitry arrangements on the circuit board 300 and do not promote a conservation of space thereon. Therefore, a surface mount retention member has come into wide application.

A pertinent conventional retention system is disclosed in U.S. Pat. No. 5,186,654. The retention system comprises a pair of U-shaped retention members. Each retention member forms a pair of leg portions extending along the longitudinal direction of a connector and generally parallel to a mating printed circuit board, and a bight portion joining the leg portion and generally perpendicular to the PCB. A dielectric housing of the connector defines a pair of recesses corresponding to the retention members. The retention members are securely engaged within the corresponding recesses. Each retention member forms a horizontal bottom surface of a leg portion to be surface mounted to a corresponding soldering pads of the mating circuit board. Thus, the connector is fixed to the PCB. However, since the retention members are manufactured from a large amount of material and the recesses of the housing are difficult to form, the manufacturing process becomes complicated and costly.

BRIEF SUMMARY OF THE INVENTION

A main object of the present invention is to provide an electrical connector having retention members surface mounted to a circuit board for effectively resisting a mating force of the connector thereby preventing a disengagement of contacts of the connector from a printed circuit board and providing reliable signal transmission between the connector and the circuit board.

Another object of the present invention is to provide an electrical connector having retention members for securely fixing the connector to a circuit board wherein the retention members are easy to manufacture at a low cost.

An electrical connector in accordance with one aspect of the present invention for engaging with a mated connector in a mating direction comprises a dielectric housing receiving a plurality of contacts therein, and a pair of retention members for securely fixing the connector to a circuit board. The housing forms a pair of latching members projecting from opposite ends. Each latching member forms a recess and a projection integrally extending into the recess. Each retention member is L-shaped and comprises a latching portion and a mounting portion. The latching portion of each retention member defines a cutout for securely engaging with the corresponding projection of the latching member in a latching direction perpendicular to the mating direction. The mounting portion of each retention member adapted to be surface mounted to the circuit board. The retention members and the latching members have a simple structure thereby decreasing manufacturing costs of the connector.

Other objects, advantages and novel features of the invention will become more apparent from the following detailed description when taken in conjunction with the accompanying drawings.

DETAILED DESCRIPTION OF THE INVENTION

Figure 1:
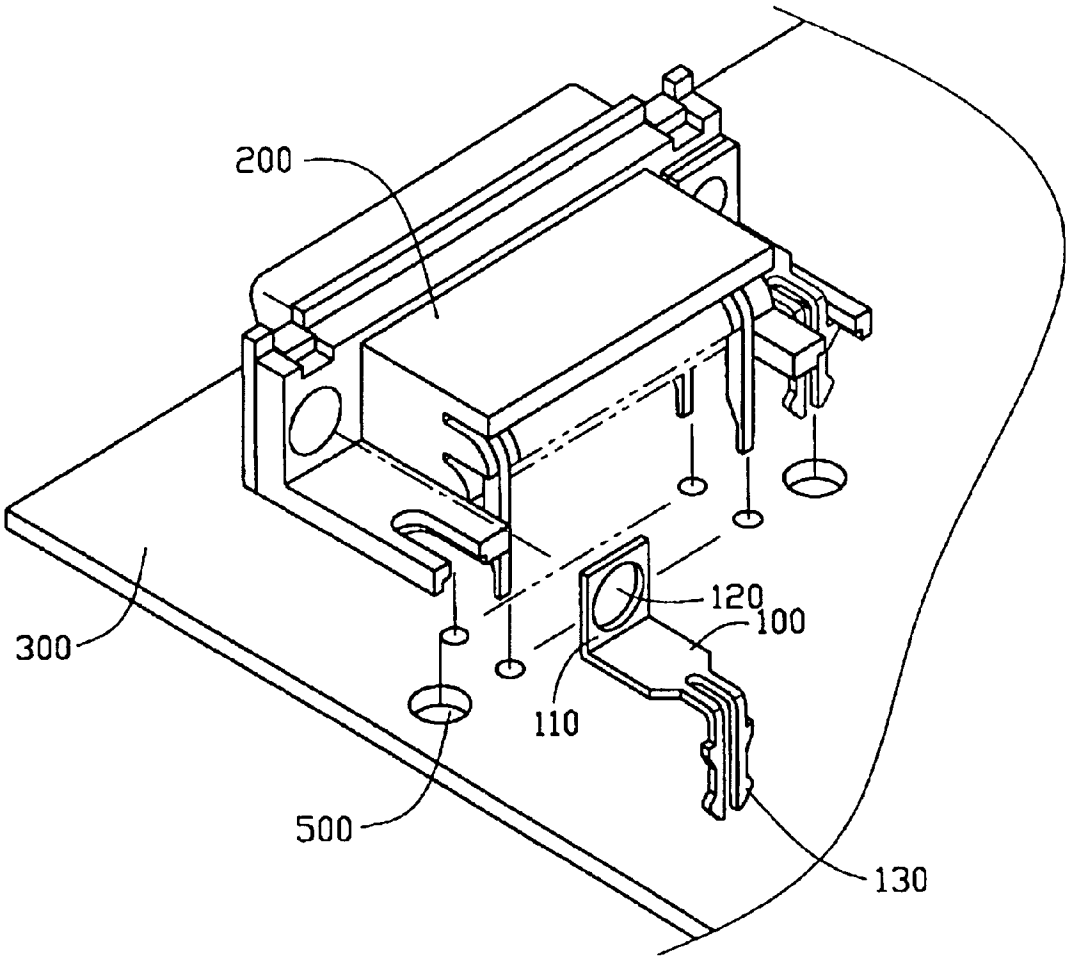
FIG. 1 (PRIOR ART)
FIG. 1 is a perspective view of a conventional electrical connector.
Figure 2:
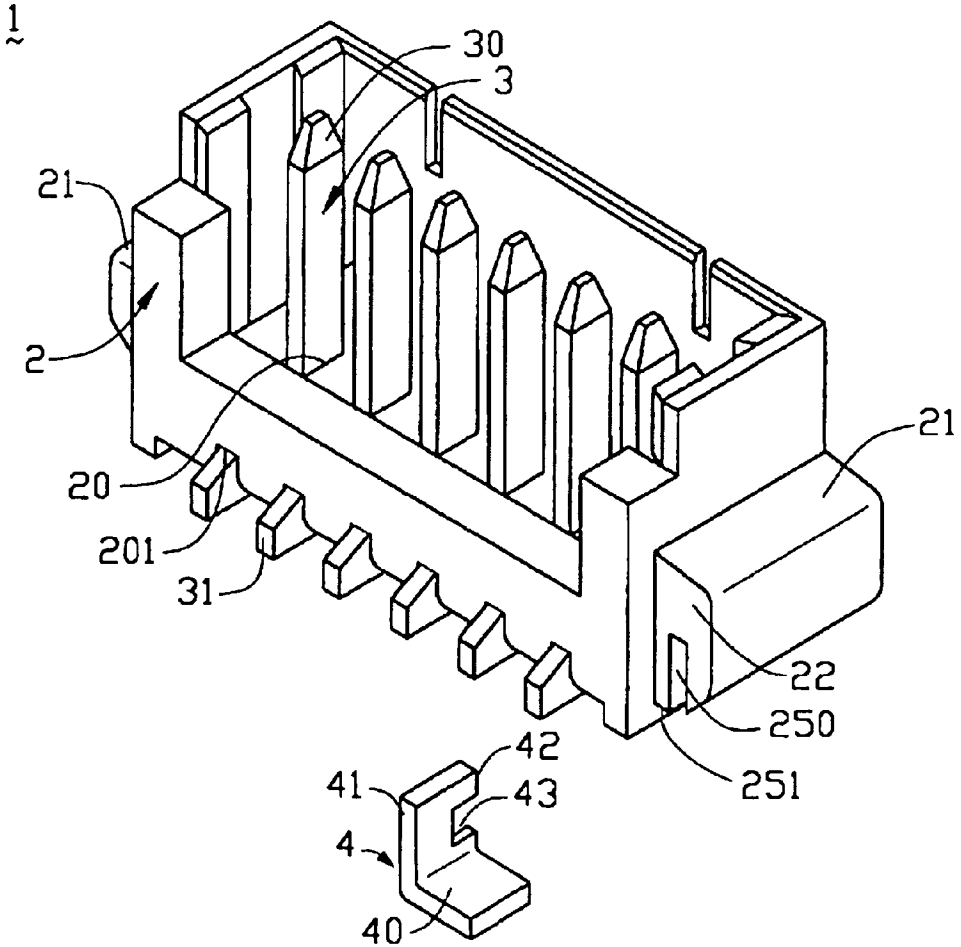
FIG. 2 is a perspective view of an electrical connector in accordance with a first embodiment of the present invention, with a retention member being separated from the connector.
Figure 3:
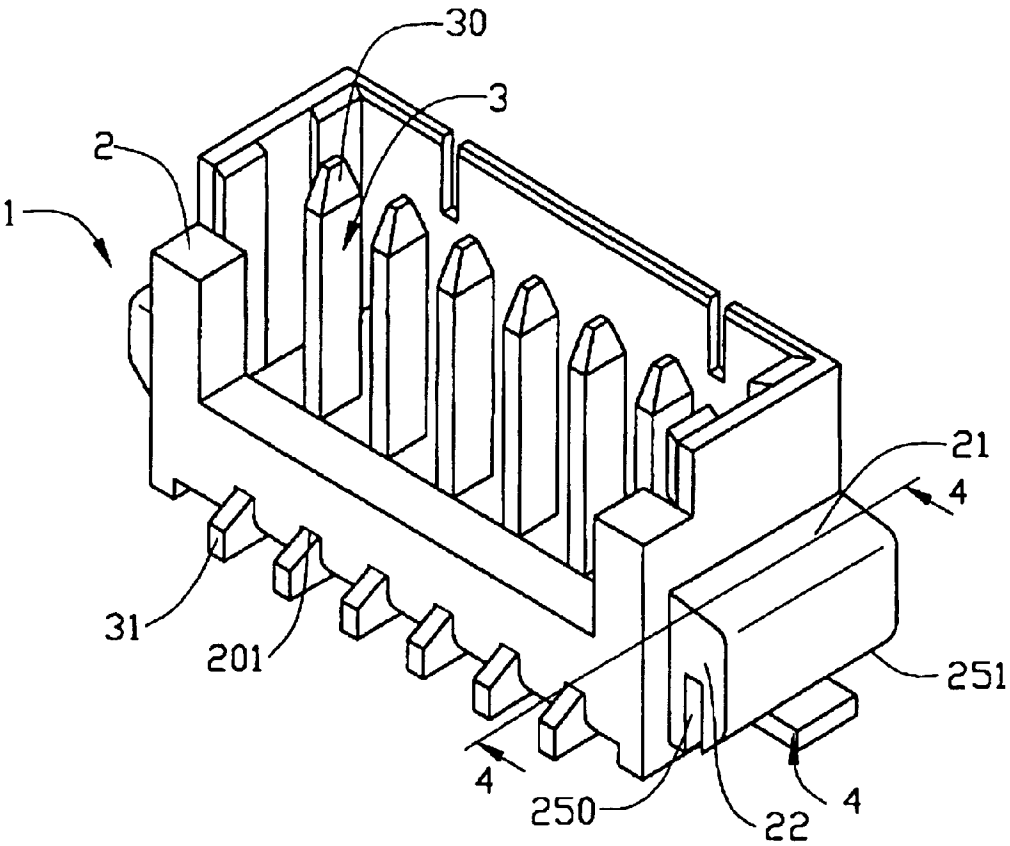
FIG. 3 is a view similar to FIG. 2, with the retention member being separated from the connector.
Figure 4:
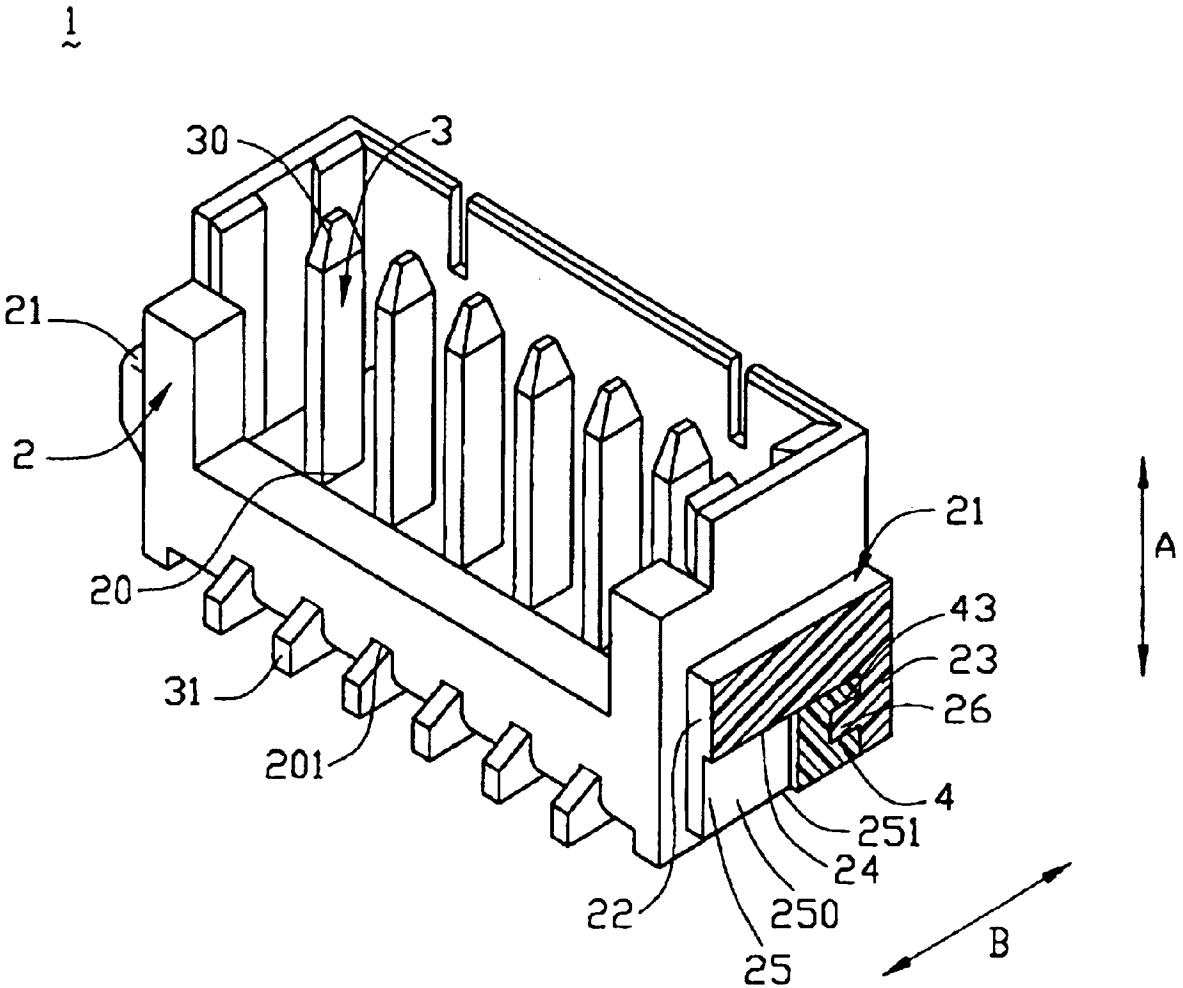
FIG. 4 is a cross sectional view taken along line 4—4 of FIG. 3.

Referring to FIGS. 2, 3 and 4, an electrical connector 1 in accordance with the present invention comprises a dielectric housing 2 receiving a plurality of contacts 3 therein, and a pair of retention members 4 (only one shown) for securely fixing the connector 1 to a circuit board (not shown).

Each contact 3 comprises a mating end 30 for electrically contacting a corresponding terminal of a mating connector (not shown), and a connecting end 31 perpendicular to the mating end 30 for electrically connecting with the circuit board. The housing 2 is elongate and defines a plurality of passageways 20 perpendicular to a longitudinal direction of the housing 2 for extension of the mating ends 30 of the corresponding contacts 3 therethrough. A plurality of grooves 201 is defined in a bottom surface of the housing 2 in communication with and perpendicular to the corresponding passageways 20 for receiving the connecting ends 31 of the corresponding contacts 3. The passageways 20 and the mating ends 30 of the contacts 3 extend in a mating direction A of the connector 1 engaging with a mating connector. The mating direction A is perpendicular to the circuit board on which the connector 1 is fixed.

The housing 2 is equipped with a pair of latching members 21 outwardly projecting from opposite ends for engaging with the corresponding retention members 4. Each latching member 21 is block-like and forms a recess 250 exposed to a front face 22 and a bottom face 251 thereof, and a projection 26 integrally extending into the recess 250 from a rear wall 23 of the latching member 21 toward the front face 22. The projection 26 projects from the rear wall 23 in a direction perpendicular to the mating direction A.

Each retention member 4 comprises a latching portion 41 for being secured within the recess 250 of the corresponding latching members 21, and a mounting portion 40 perpendicular to the latching portion 41 and extending beyond the latching member 21 for being surface mounted to the circuit board. A cutout 43 is defined in the latching portion 41 for securely engaging with the projection 26 of the latching member 21. Thus, a cantilevered beam 42 is formed adjacent to the cutout 43. The width of the latching portion 41 is substantially equal to the width of the recess 250 thereby properly securing the retention member 4 in the corresponding recess 250.

The retention members 4 are fixed to the corresponding latching members 21 of the housing 2 by inserting the latching portions 41 into the corresponding recesses 250 in a latching direction B which is perpendicular to the mating direction A. An outer lateral surface of the latching portion 41 of each retention member 4 abuts against an inner side wall 25 of the corresponding recess 250. The projection 26 is securely received within the cutout 43 and the cantilevered beam 42 is sandwiched between the projection 26 and an inner top wall 24 of the recess 250. Since the latching direction B is perpendicular to the mating direction A of the connector 1, the connector 1 will not be displaced along the mating direction A when the connector 1 is inserted into or withdrawn from the mating connector.

Figure 5:
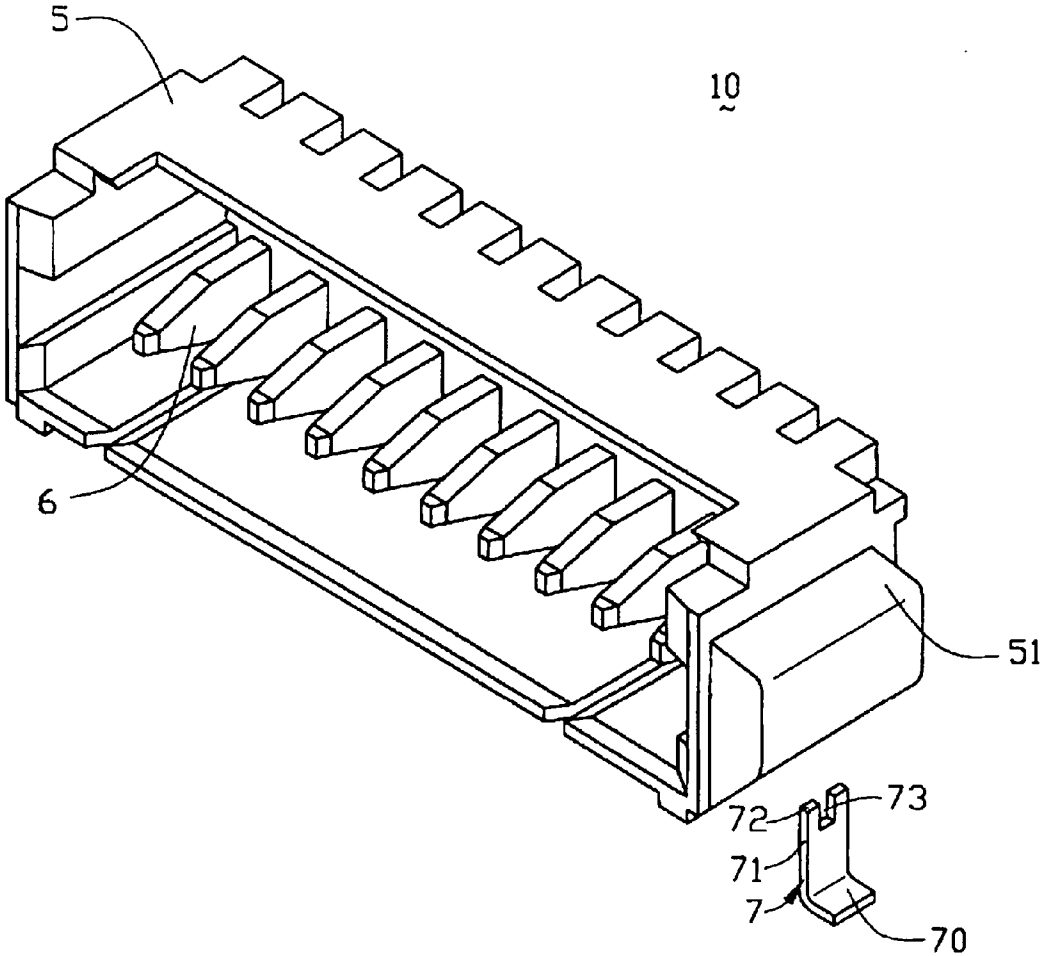
FIG. 5 is a perspective view of an electrical connector in accordance with a second embodiment of the present invention, with a retention member being separated from the connector.
Figure 6:
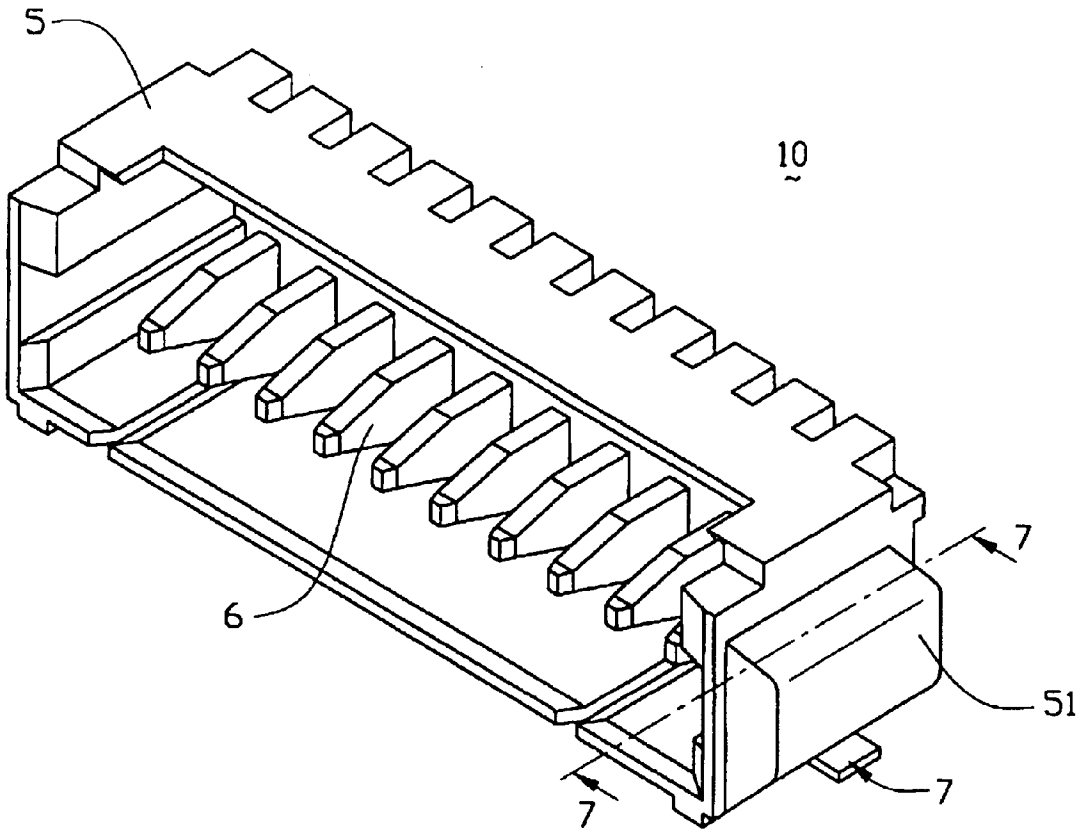
FIG. 6 is a view similar to FIG. 5.
Figure 7:
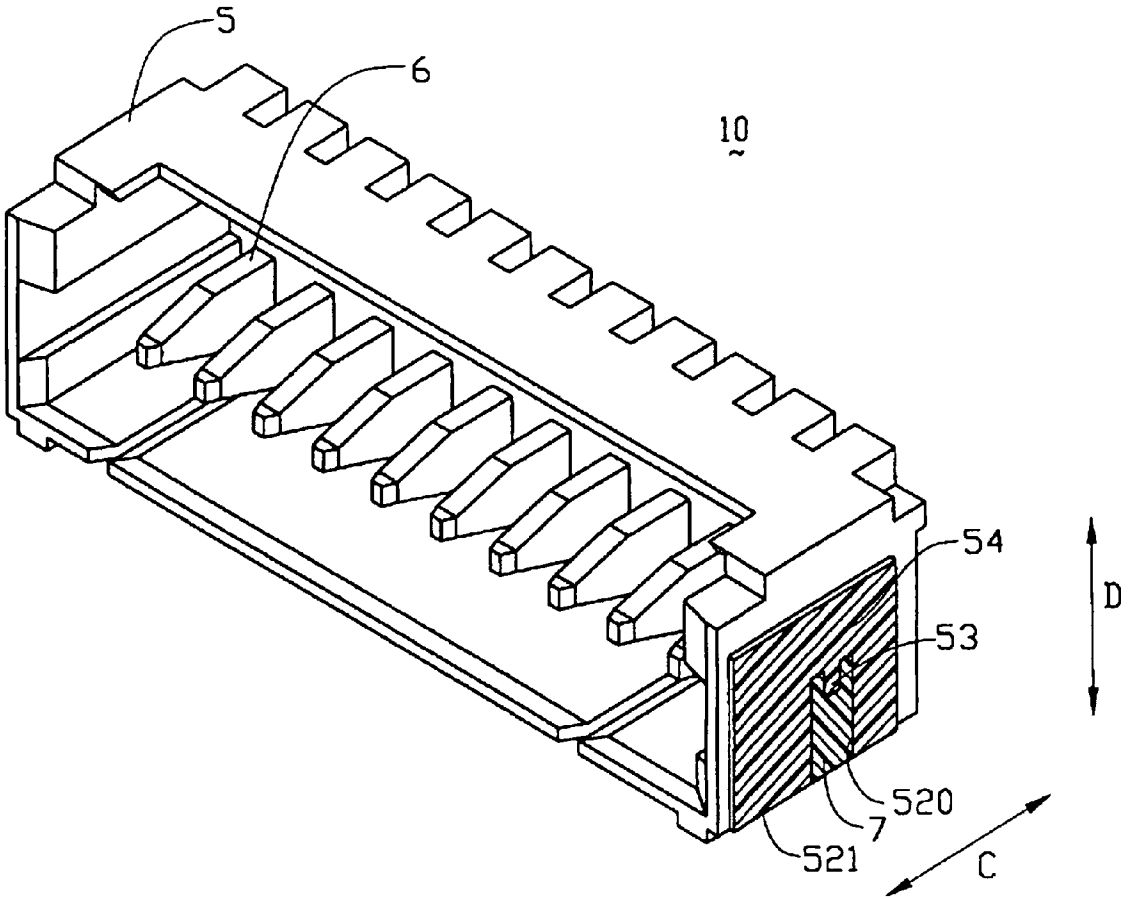
FIG. 7 is a cross sectional view taken along line 7—7 of FIG. 6.

Referring now to FIGS. 5, 6 and 7, an electrical connector 10 in accordance with a second embodiment of the present invention comprises a dielectric housing 5 receiving a plurality of contacts 6 therein, and a pair of retention members 7 (only one shown) for securely fixing the connector 10 to a circuit board (not shown). The housing 5 is elongate and mates with a mating connector (not shown) in a mating direction C parallel to the circuit board.

The housing 5 forms a pair of latching members 51 outwardly projecting from opposite ends thereof. Each latching member 51 defines a recess 520 exposed to a bottom face 521 thereof. A projection 53 integrally extends from an upper wall 54 of the latching member 51 into the recess 520.

Each retention member 7 is L-shaped and comprises a latching portion 71 for engaging within the corresponding recess 520 and a mount portion 70 perpendicular to the latching portion 71 for being surface mounted to the circuit board. Each latching portion 71 has a width substantially equal to the width of the corresponding recess 520 of the latching member 51. A cutout 73 is centrally defined in a top edge 72 of the latching portion 71 for securely receiving the corresponding projection 53 therein.

When the retention members 7 are inserted into the corresponding latching members 51 of the housing 5, the latching portions 71 are inserted into the corresponding recesses 520 in a latching direction D which is perpendicular to the mating direction C. The mounting portions 70 extend beyond the corresponding latching member 51 for being surface mounted to the circuit board. Therefore, the retention members 7 successfully prevent the connector 10 from moving in the mating direction C thereby properly securing the connector 10 on the circuit board, thus, the contacts 6 can still have a reliable connection with the printed circuit board after the connector 10 has been engaged disengaged with from the mated connector after a period of time.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. An electrical connector for mounting to a circuit board and for receiving a mating connector in a mating direction, comprising:

a dielectric housing receiving a plurality of contacts therein and comprising a pair of latching members outwardly extending from opposite ends thereof, and a pair of retention members, each retention member comprising a planar latching portion for being secured to *a* corresponding latching member in a latching direction perpendicular to the mating direction, and a mounting portion perpendicular to the latching portion for being surface mounted to the circuit board;

wherein the mating direction is parallel to the circuit board;

wherein each latching member defines a recess exposed to a bottom face thereof and forms a projection integrally extending downwardly into the recess in the latching direction; and wherein a cutout is centrally defined in a top edge of the latching portion of each retention member for securely receiving the projection of the corresponding latching member therein in the latching direction thereby securely fixing the retention member in the latching member.

2. The electrical connector as claimed in claim 1, wherein the latching portion has a width substantially equal to the width of the recess of the latching member.

3. An electrical connector for mounting to a circuit board and for receiving a mating connector in a mating direction, comprising:

a dielectric housing receiving a plurality of contacts therein and comprising a pair of latching members outwardly extending from opposite ends thereof, and a pair of retention members, each retention member comprising a planar latching portion for being secured to *a* corresponding latching member in a latching direction perpendicular to the mating direction, and a mounting portion perpendicular to the latching portion for being surface mounted to the circuit board, wherein the mating direction of the connector is perpendicular to the circuit board;

wherein each latching member defines a recess exposed to a front face and a bottom face thereof, and forms a projection integrally extending laterally into the recess in the latching direction perpendicular to the mating direction; and wherein a cutout is centrally defined in a [top] *side* edge of the latching portion of each retention member for securely receiving the projection of the corresponding latching member therein in the latching direction thereby securely fixing the retention member in the latching member.

4. The electrical connector as claimed in claim 3, wherein the latching portion has a width substantially equal to the width of the recess of the latching member.

* * * * *